United States Patent
Gaal et al.

(10) Patent No.: US 9,820,205 B2
(45) Date of Patent: Nov. 14, 2017

(54) SIGNALING VIRTUAL CELL ID SETS

(71) Applicant: QUALCOMM Incorporated, San Diego, CA (US)

(72) Inventors: Peter Gaal, San Diego, CA (US); Arumugam Chendamarai Kannan, San Diego, CA (US); Hao Xu, San Diego, CA (US); Tao Luo, San Diego, CA (US)

( * ) Notice: Subject to any disclaimer, the term of this patent is extended or adjusted under 35 U.S.C. 154(b) by 242 days.

(21) Appl. No.: 14/808,815

(22) Filed: Jul. 24, 2015

(65) Prior Publication Data
US 2016/0037420 A1 Feb. 4, 2016

Related U.S. Application Data

(60) Provisional application No. 62/030,461, filed on Jul. 29, 2014.

(51) Int. Cl.
*H04W 4/00* (2009.01)
*H04W 36/20* (2009.01)
(Continued)

(52) U.S. Cl.
CPC .......... *H04W 36/20* (2013.01); *H04L 5/0035* (2013.01); *H04L 5/0053* (2013.01); *H04W 16/32* (2013.01);
(Continued)

(58) Field of Classification Search
CPC ... H04W 36/20; H04W 16/32; H04W 72/042; H04W 72/082; H04W 88/08;
(Continued)

(56) References Cited

U.S. PATENT DOCUMENTS

| 9,450,719 B2 * | 9/2016 | Park ...................... H04B 7/024 |
| 2013/0170449 A1 | 7/2013 | Chen et al. |
| 2013/0301467 A1 * | 11/2013 | Kang ..................... H04B 7/024 370/252 |

FOREIGN PATENT DOCUMENTS

| EP | 2665221 A2 | 11/2013 |
| WO | WO-2013133608 A1 | 9/2013 |

(Continued)

OTHER PUBLICATIONS

International Search Report and Written Opinion—PCT/US2015/042204—ISA/EPO—dated Oct. 12, 2015.
(Continued)

*Primary Examiner* — Maharishi Khirodhar
(74) *Attorney, Agent, or Firm* — Norton Rose Fulbright US LLP

(57) ABSTRACT

An efficient signaling of virtual cell identifier (ID) sets by base stations is disclosed. A serving base station identifies a set of virtual cell IDs of transmission points from a coordinated multipoint (CoMP) cluster in which a served user equipment (UE) is located along with neighboring transmission points of neighboring CoMP clusters. The serving base station groups the virtual cell IDs available for use in transmission into subsets of virtual cell IDs either according to the primary cell IDs associated with each virtual cell ID or according to the channel state information (CSI) resources associated with each primary cell ID and then transmits each of the subsets of virtual cell IDs to the UE.

26 Claims, 10 Drawing Sheets

(51) Int. Cl.
  *H04L 5/00*    (2006.01)
  *H04W 72/08*   (2009.01)
  *H04W 16/32*   (2009.01)
  *H04W 72/04*   (2009.01)
  *H04W 88/08*   (2009.01)

(52) U.S. Cl.
  CPC ....... *H04W 72/042* (2013.01); *H04W 72/082* (2013.01); *H04L 5/0051* (2013.01); *H04L 5/0073* (2013.01); *H04W 88/08* (2013.01)

(58) Field of Classification Search
  CPC ... H04L 5/0053; H04L 5/0035; H04L 5/0051; H04L 5/0073
  See application file for complete search history.

(56) References Cited

FOREIGN PATENT DOCUMENTS

| | | | |
|---|---|---|---|
| WO | WO 2013184867 A2 * | 12/2013 | .......... H04W 72/042 |
| WO | WO-2013184867 A2 | 12/2013 | |

OTHER PUBLICATIONS

Renesas Mobile Europe Ltd: "On the Number of Physical Cell Identities in Small Cell Scenarios", 3GPP Draft, R1-133245, 3rd Generation Partnership Project (3GPP), Mobile Competence Centre, 650, Route Des Lucioles, F-06921 Sophia-Antipolis Cedex, France vol. RAN WG1, No. Barcelona, Spain; 20130819-20130823, Aug. 9, 2013, 4 Pages, Retrieved from the Internet: URL:http://www.3gpp.org/ftp/tsg_ran/WG1_RL 1/TSGR1_74/Docs/.

* cited by examiner

SIGNALING VIRTUAL CELL ID SETS

CROSS-REFERENCE TO RELATED APPLICATIONS

This application claims the benefit of U.S. Provisional Patent Application No. 62/030,461, entitled, "SIGNALING VIRTUAL CELL ID SETS," filed on Jul. 29, 2014, which is expressly incorporated by reference herein in its entirety.

BACKGROUND

Field

Aspects of the present disclosure relate generally to wireless communication systems, and more particularly, to signaling virtual cell identifier (ID) sets.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Aspects of the present disclosure are directed to efficient signaling of virtual cell identifier (ID) sets by base stations.

In operation of the various aspects, a serving base station would identify a set of virtual cell IDs of transmission points from a coordinated multipoint (CoMP) cluster in which a served UE is located, along with neighboring transmission points of neighboring CoMP clusters. The serving base station groups the virtual cell IDs into subsets of virtual cell IDs either according to the primary cell IDs associated with each virtual cell ID or according to the channel state information (CSI) resources associated with each primary cell ID and then transmits each of the subsets of virtual cell IDs to the UE.

In an additional aspect of the disclosure, a method of wireless communication includes identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The method further provide for the serving base station to group each virtual cell ID available for use in transmission into one or more subsets according to a primary cell ID associated with each virtual cell ID. These subsets of virtual cell IDs would then be transmitted to the UE.

In an additional aspect of the disclosure, a method of wireless communication includes identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The method further provides for the serving base station to group each virtual cell ID available for use in transmission into one or more subsets according a primary cell ID associated with each virtual cell ID and further according to each of the channel state information (CSI) resources associated with the primary cell ID. These subsets of virtual cell IDs would then be transmitted to the UE.

In an additional aspect of the disclosure, an apparatus configured for wireless communication includes means for identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The apparatus further provide means for the serving base station to group each virtual cell ID available for use in transmission into one or more subsets according to a primary cell ID associated with each virtual cell ID, and a means for transmission of these subsets of virtual cell IDs to the UE.

In an additional aspect of the disclosure, an apparatus configured for wireless communication includes means for identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The apparatus further provides means for the serving base station to group each virtual cell ID available for use in transmission into one or more subsets according a primary cell ID associated with each virtual cell ID and further according to each of the channel state information (CSI)

resources associated with the primary cell ID and a means for transmission of these subsets of virtual cell IDs to the UE.

In an additional aspect of the disclosure, a computer program product has a computer-readable medium having program code recorded thereon. This program code includes code for identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The program code further provide code for the serving base station to group each virtual cell ID available for use in transmission into one or more subsets according to a primary cell ID associated with each virtual cell ID, and code for transmission of these subsets of virtual cell IDs to the UE.

In an additional aspect of the disclosure, a computer program product has a computer-readable medium having program code recorded thereon. This program code includes code for identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The program code further provides code for the serving base station to group each virtual cell ID available for use in transmission into one or more subsets according a primary cell ID associated with each virtual cell ID and further according to each of the channel state information (CSI) resources associated with the primary cell ID and code for transmission of these subsets of virtual cell IDs to the UE.

In an additional aspect of the disclosure, an apparatus includes at least one processor and a memory coupled to the processor. The processor is configured for identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The processor is further configured for causing the serving base station to group each virtual cell ID available for use in transmission into one or more subsets according to a primary cell ID associated with each virtual cell ID, and for transmission of these subsets of virtual cell IDs to the UE.

In an additional aspect of the disclosure, an apparatus includes at least one processor and a memory coupled to the processor. The processor is configured for identification, by a serving base station, of a set of virtual cell identities (IDs), in which the set of virtual cell IDs is associated with transmission points located within the coordinated communication cluster in which a served UE is located or any additional neighboring transmission points located within a neighboring coordinated communication cluster. The processor is further configured for causing the serving base station to group each virtual cell ID available for use in transmission into one or more subsets according a primary cell ID associated with each virtual cell ID and further according to each of the channel state information (CSI) resources associated with the primary cell ID and for transmission of these subsets of virtual cell IDs to the UE.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
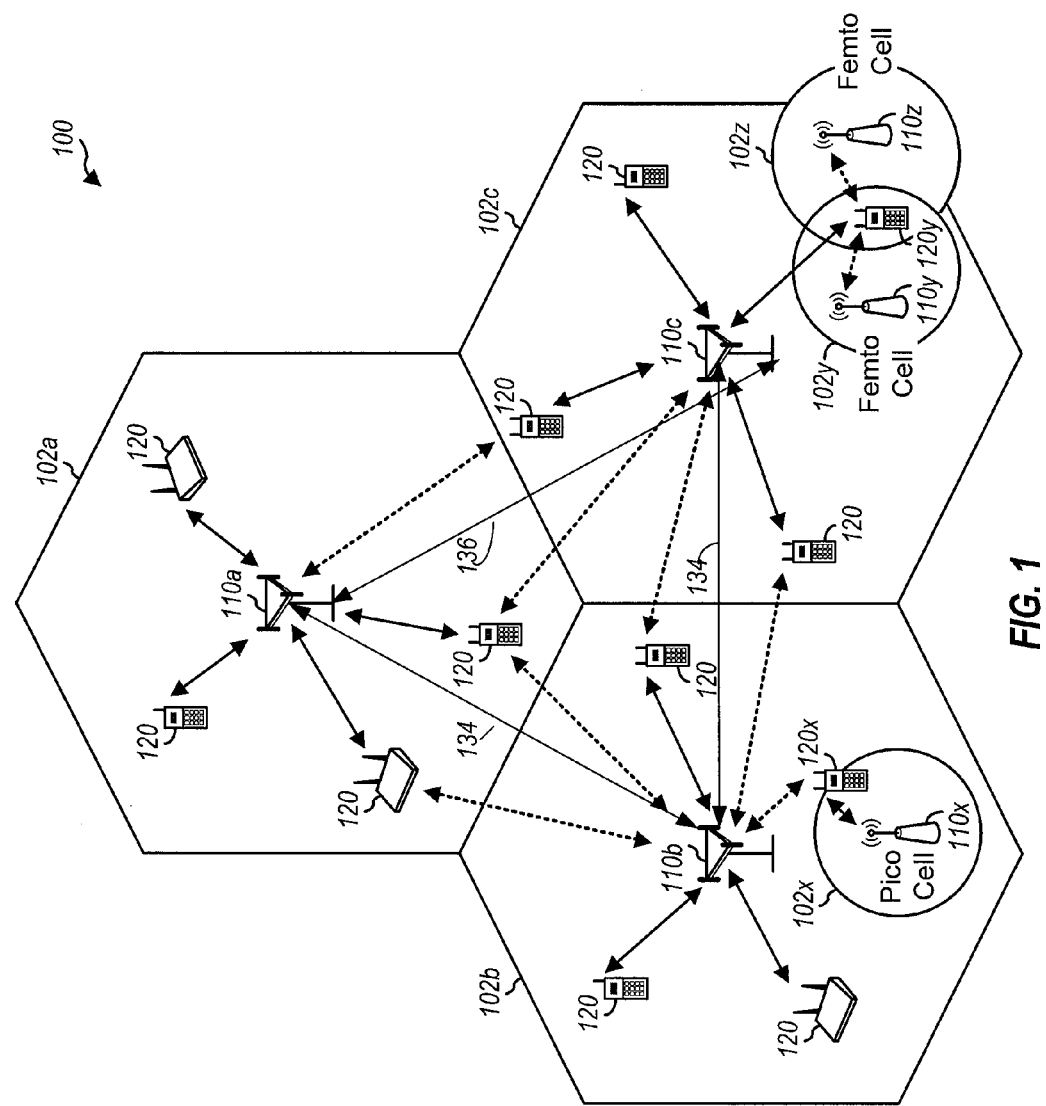
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells. Femto and pico cells may be collectively referred to as small cells, which have lower power and provide coverage over a relatively smaller geographic area than macro cells and macro eNBs.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
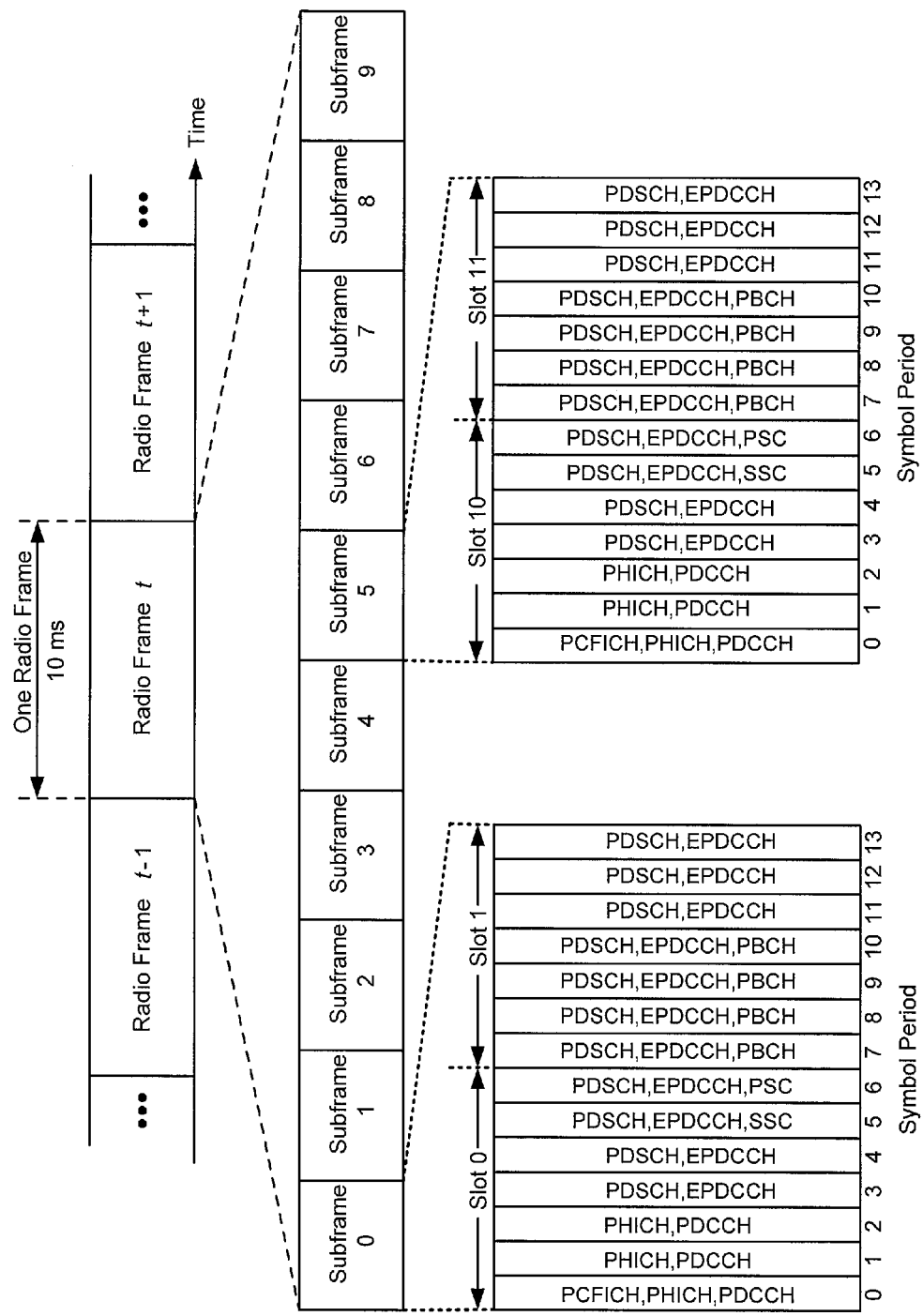
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Enhanced-Physical Downlink Control Channel (EPDCCH) is included in the later symbol periods of each subframe. The EPDCCH is a new type of control channel. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

Figure 3:
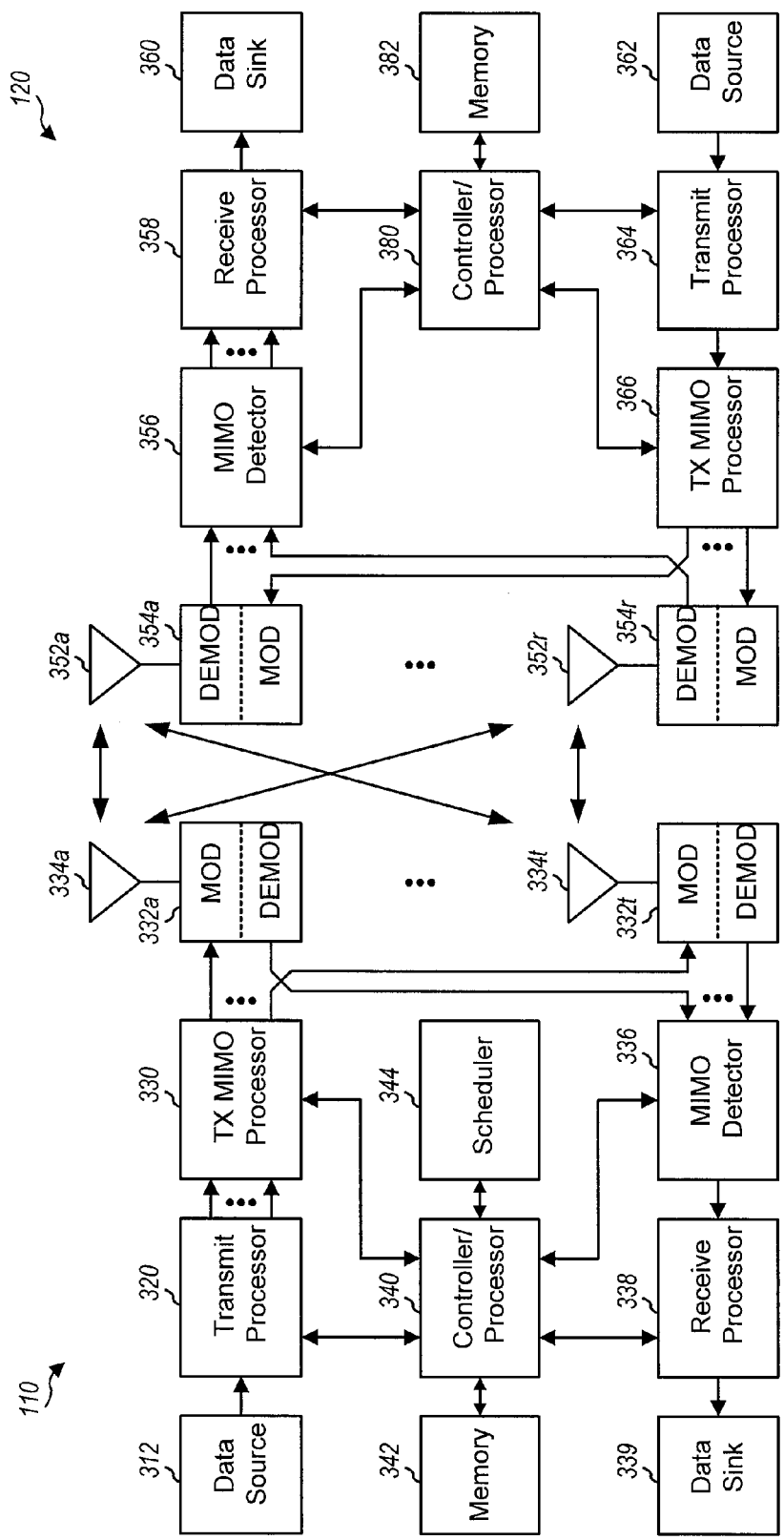
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 334a through 334t, and the UE 120 may be equipped with antennas 352a through 352r.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the eNB 110 and the UE 120, respectively. The controller/processor 340 and/or other processors and modules at the eNB 110 may perform or direct the execution of various processes for the techniques described herein. The controllers/processor 380 and/or other processors and modules at the UE 120 may also perform or direct the execution of the functional blocks illustrated in FIGS. 4 and 8, and/or other processes for the techniques described herein. The memories 342 and 382 may store data and program codes for the eNB 110 and the UE 120, respectively. A scheduler 344 may schedule UEs for data transmission on the downlink and/or uplink.

Coordinated Multi-Point (CoMP) operation is a feature of LTE-A that provides enhanced quality of service and transmission efficiency in both downlink and uplink transmissions in heterogeneous networks. Whereas users located at a cell edge in homogenous networks suffer from decreasing signal strength compounded by neighbor cell interference, CoMP is designed to enable use of a neighboring cell to also transmit the same signal as the serving cell to the cell edge UE, thus, enhancing quality of service on the perimeter of a serving cell.

CoMP includes a range of different techniques that enable the dynamic coordination of transmission and reception over a variety of different base stations. The goal is to improve overall quality for the user as well as improving the utilization of the network. Although CoMP includes a complex set of techniques, it brings many advantages to the user as well as the network operator. First, CoMP allows for better utilization of the network by providing connections to several base stations at once. Using the CoMP connection to several base stations, data can be passed through least loaded base stations, including small cells, for better resource utilization.

Additionally, CoMP may provide enhanced reception performance by using several cell sites for each connection. This would typically result in improved overall reception and reduction of the number of dropped calls. Multiple site reception also may increase received power. The joint reception from multiple base stations or small cells using CoMP techniques enables the overall received power at the handset to be increased. CoMP also allows for interference reduction by using the signals of neighboring or additional cells as communication cells that support the communication by the serving macro cell, instead of merely providing neighboring interference.

In order for CoMP to work effectively, close coordination is maintained between a number of geographically separated base stations. The various CoMP base stations dynamically coordinate to provide joint scheduling and transmissions as well as providing joint processing of the received signals. In this way a UE at the edge of a cell is able to be served by two or more base stations to improve signals reception/transmission and increase throughput particularly under cell edge conditions.

CoMP operations generally fall into two major categories: Joint processing, which occurs where there is coordination between multiple entities, such as base stations, that are simultaneously transmitting or receiving to or from UEs; and coordinated scheduling or beamforming, often referred to as CS/CB (coordinated scheduling/coordinated beamforming). CS/CB is a form of coordination where a UE transmits with a single transmission or reception point, while communication is made with an exchange of control among several coordinated entities.

To achieve either of these modes of CoMP operations, highly detailed feedback on the channel properties is exchanged in a fast manner so that the changes can be made without causing delays in service or communications between all participating base stations and UEs. Thus, close coordination between the base stations to facilitate the combination of data or fast switching of the cells is an important consideration.

The techniques used for CoMP operations are very different for the uplink and downlink. This results from the fact that the base stations are in a network, connected to other base stations, whereas the UEs are individual elements.

For downlink CoMP, dynamic coordination is employed among several geographically separated base stations or cells transmitting to the UE. The two formats of CoMP operation can be divided for the downlink. Joint processing schemes for transmitting in the downlink provides for data to be transmitted to the UE simultaneously from a number of different eNBs. The goal of this multiple transmission is to improve the received signal quality and strength. It may also benefit active cancelation of interference from transmissions that are intended for other UEs. This form of CoMP operation places a high demand onto the backhaul network because the data to be transmitted to the UE should be sent to each base station or cell that will be transmitting to the UE. Such operations may easily double or triple the amount of data in the network dependent upon how many base stations or cells will be sending the data. In addition to additional data in the network for transmission, joint processing data received at different eNBs from the UD will be sent between all eNBs involved in the CoMP area.

Coordinated scheduling and or beamforming may also be implemented in downlink CoMP operations. Using this concept, data intended for a single UE is transmitted from one eNB. However, the scheduling decisions as well as any beams may be coordinated among other CoMP base stations or cells in order to control the interference that may be generated. The advantage of this approach is that the requirements for coordination across the backhaul network are considerably reduced because (1) the UE data will not be transmitted from multiple base stations or cells, and, therefore, will only be directed to one eNB; and (2) only scheduling decisions and the details of beam forming will be coordinated between multiple eNBs.

For uplink CoMP operations, joint reception and processing take advantage of using multiple antennas at different sites. By coordinating between the different base stations or cells, it is possible to form a virtual antenna array. The signals received by the base stations are then combined and processed to produce the final output signal. This technique also allows for signals that are very low in strength, or masked by interference in some areas to be received with fewer errors. The main disadvantage with this technique is that large amounts of data would be transferred between the receiving base stations or cells for processing.

CoMP operation in the uplink provides for the introduction of virtual cell IDs. Beginning in earlier LTE systems, the generation of the Demodulation Reference Signal (DMRS) embedded in two defined SC-FDMA symbols in an uplink subframe is dependent on the physical cell identity (PCI) of the serving cell. The PCI is derived from the downlink. For future heterogeneous networks deployment scenarios, where a macro cell provides the coverage and several small cells are used for capacity, there is higher uplink interference at the cell boundaries. This is especially true for the case where the macro cell and small cells are using the same cell identities. Thus, in order to increase the ability to differentiate between cells involved in CoMP communications, the concept of virtual cell IDs is introduced. Because the virtual cell ID reception point and transmission point may not necessarily be the same, the virtual cell ID, is assigned by higher layers to identify the different transmission points with any particular CoMP cluster. A CoMP cluster is the group of access points, remote radio heads (RRHs), base stations, and the like that are coordinating to provide the multipoint communications.

The virtual cell ID of neighboring transmission points is one of the parameters used by a UE to detect, cancel, or mitigate interfering transmissions. The virtual cell ID may be used for CoMP transmissions in transmission mode 10, for example. Using either the PCI or virtual cell ID in combination with a scrambling ID, a base station will generate the DMRS sequence. When attempting to detect, cancel, or mitigate such interfering signals, a UE would perform blind detection of all virtual cell IDs and/or scrambling IDs. However, because of the large number of potential virtual cell ID values and scrambling IDs, performing blind detection on all such signals would demand considerable resources and time from the UE. Accordingly, network signaling of a subset of possible virtual cell IDs may assist the UE to blind detect among this reduced subset of virtual cell IDs.

Various aspects of the present disclosure provide for efficient methods of signaling a subset of possible virtual cell IDs of neighboring transmission points to a UE, both within a single CoMP cluster, and across multiple CoMP clusters, including neighboring cells.

Figure 4:
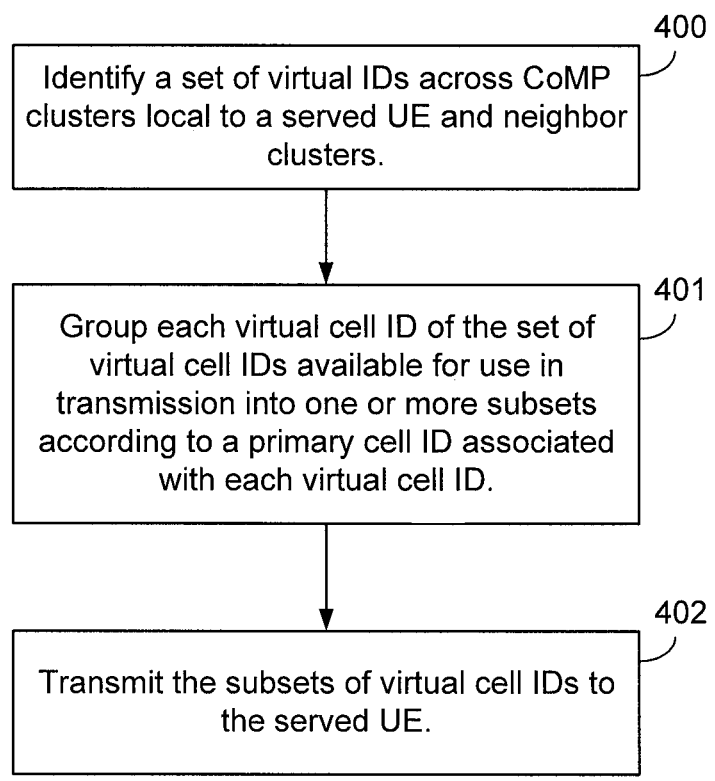
FIG. 4 is a functional block diagram illustrating example blocks executed to implement one aspect of the present disclosure.

In a first aspect of the present disclosure subsets of virtual cell IDs are grouped according to their association with a macro cell ID or CRS. Each CRS may be associated with one macro cell ID. Therefore, the grouping groups according to the particular macro cell ID. FIG. 4 is a functional block diagram illustrating example blocks executed to implement one aspect of the present disclosure. At block 400, a serving base station identifies a set of virtual cell IDs for transmission points across CoMP clusters both local to a served UE and in neighboring CoMP clusters. The maximum number of virtual cell IDs identified within the serving CoMP cluster and the maximum number of virtual cell IDs identified across all detectable CoMP clusters may be semi-statically selected by the serving cell. The serving cell may select a maximum number that is lower than the actual number in order to conserve resources or to leave out certain virtual cell IDs that may not be relevant based on the location of the UE being served.

At block 401, the serving base station groups the set of virtual cell IDs available for use in transmission into subsets according to a primary cell ID associated with each virtual cell ID. Each CoMP cluster belongs to a macro cell region, which is uniquely identifiable by a primary cell ID. Virtual cell IDs include the identification of the CoMP cluster in which it is located. However, not all of the virtual cell IDs will be used for transmission. Accordingly, the serving cell groups each of the virtual cell IDs sharing the same primary cell ID and available for use in transmission into their own subset.

At block 402, the serving cell transmits the subsets of virtual cell IDs to the UE being served. The subsets of virtual cell IDs that are grouped according to primary cell ID may be used by the UE to perform blind detection for purposes of detection, cancelation, or mitigation of interfering signals. Because of the smaller subsets of virtual cell IDs, UE blind detection may be configured more efficiently.

In operation, the serving cell identifies a restricted set of virtual cell IDs corresponding to the transmission points located in the CoMP cluster in which the UE is located as well as the neighboring cell's CoMP clusters. The virtual cell ID set encompasses different combinations of virtual cell IDs with DMRS scrambling ID. The number of virtual cell IDs per CoMP cluster is limited to a maximum of M and the total number of virtual cell IDs across all cells or all CoMP clusters to N, where M and N may be semi-statically selected by the serving cell. In practice, M will be less than or equal to N. The virtual cell ID set so chosen would be applicable to PDSCH and ePDCCH transmissions in the CoMP clusters.

According to aspects of the present disclosure, the virtual cell ID subset per macro region is signaled to the served UE. For example, given that each CoMP cluster belongs to a macro cell region, it is uniquely identifiable by a primary cell ID. Therefore, the serving cell may group the virtual cell IDs into a subset associated to the primary cell ID of the macro cell.

Figure 5:
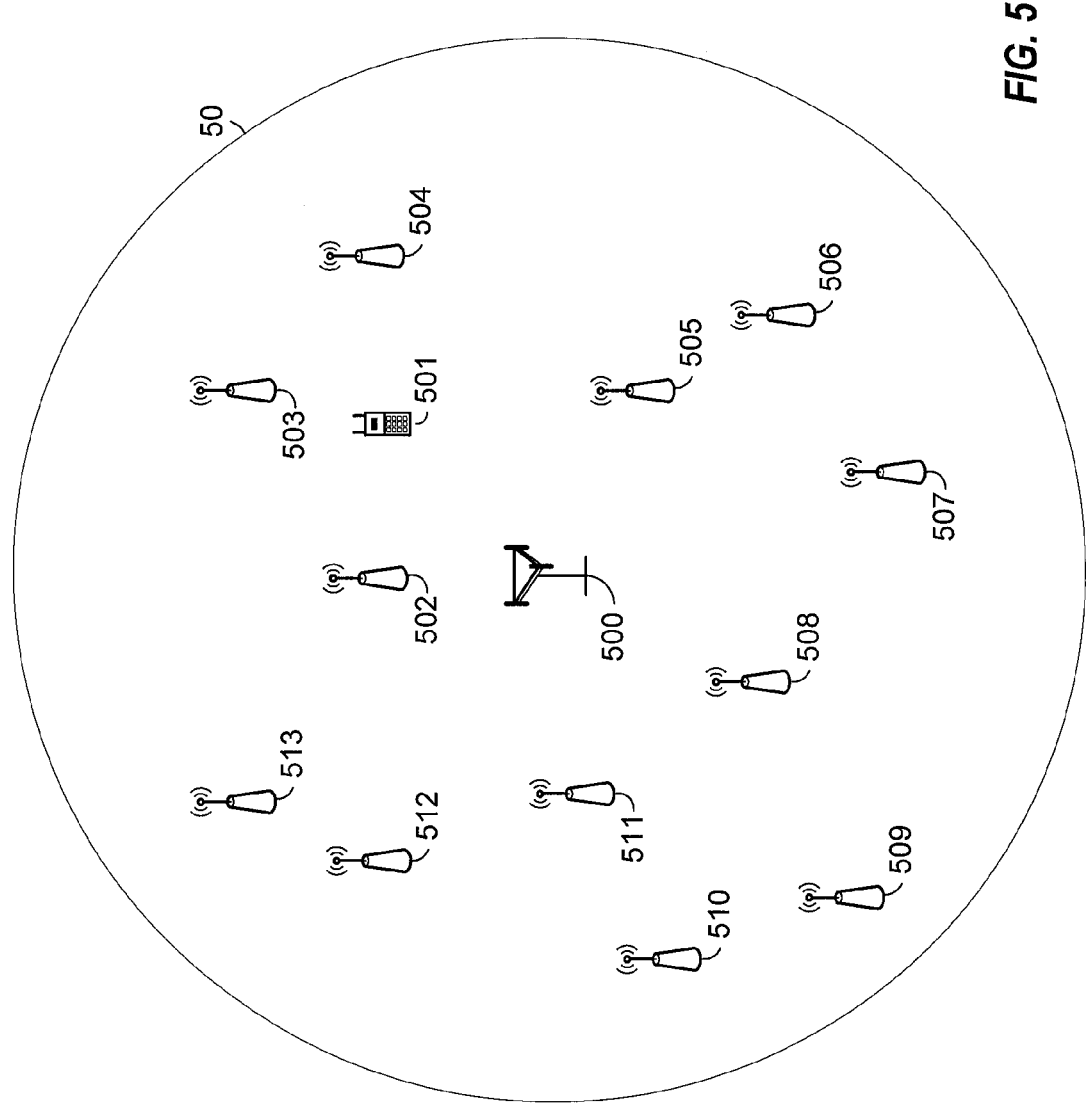
FIG. 5 is a block diagram illustrating a serving base station configured according to one aspect of the present disclosure.

FIG. 5 is a block diagram illustrating a serving base station 500 configured according to one aspect of the present disclosure. Serving base station 500 provides communication coverage in macro region 50. UE 501 is served by serving base station 500 and is located within macro region 50. In one example of operation, UE 501 may be involved in CoMP communications with serving base station 500 and transmission points identified at small cells 502-504. The total number of transmission points selected by serving base station 500 within macro region 50 are provided by small cells 502-513. In example operations of aspects of the present disclosure, total number of virtual cell IDs in combination with scrambling IDs across macro region 50 and any neighboring cells is 12. Thus, the set of virtual cell IDs may be represented according to:

$$V = \{v_0, v_1, v_2, \ldots, v_{11}\} \quad (1)$$

In this example, all of the virtual cell IDs correspond to transmission points located within macro region 50 of serving base station 500. For purposes of this example, serving base station 500 has a primary cell ID, A. Because all of the virtual cell IDs of the transmissions points are within macro region 50, serving base station 500 would signal the UE the following subset, $U_A$, of virtual cell IDs:

$$U_A = \{v_0, v_1, v_2, \ldots, v_{11}\} \quad (2)$$

Figure 6:
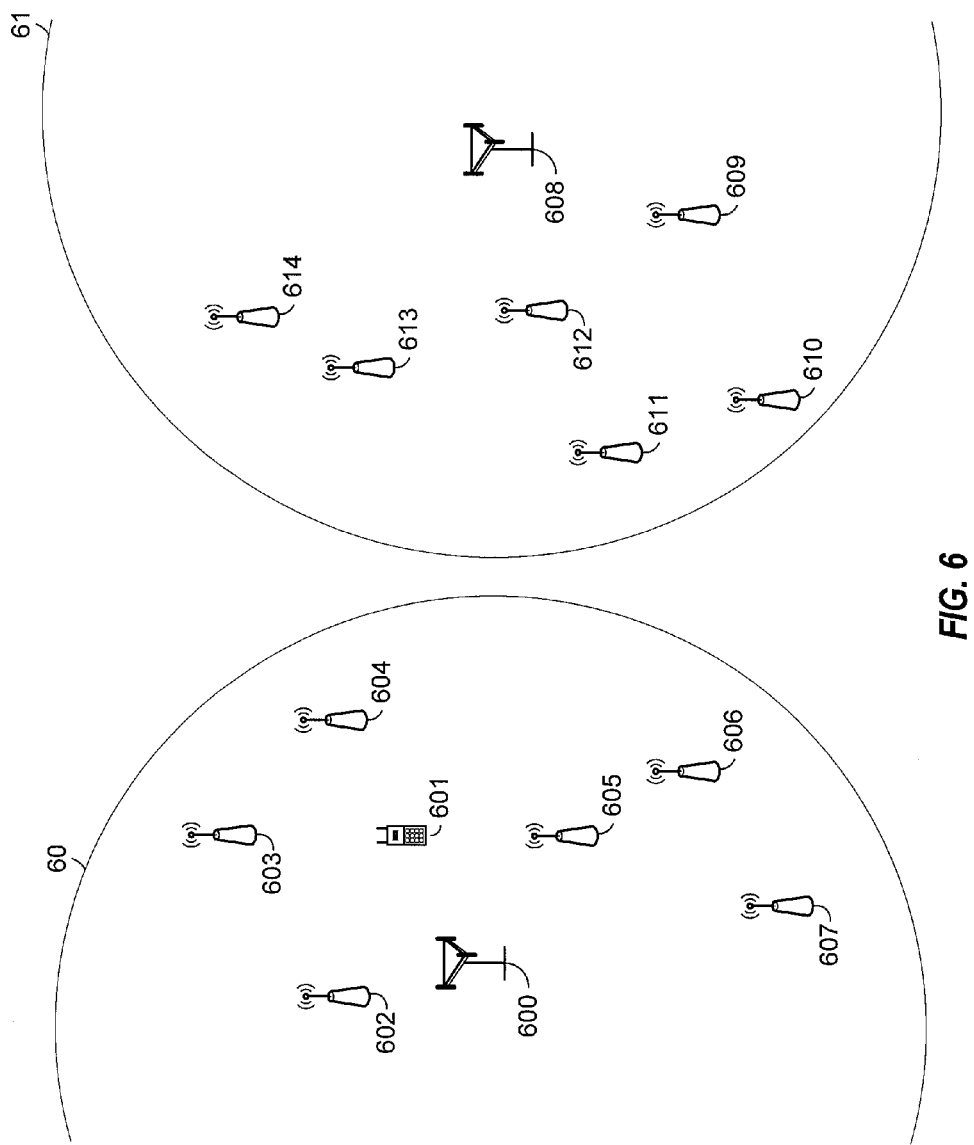
FIG. 6 is a block diagram illustrating a serving base station configured according to one aspect of the present disclosure.

FIG. 6 is a block diagram illustrating a serving base station 600 configured according to one aspect of the present disclosure. Serving base station 600 provides communication coverage across macro region 60. UE 601 is located within macro region 60 and is engaged in communication services with serving base station 600. UE 601 may also be engaged in CoMP communications with serving base station 600 and any number of transmission points located within macro region 60, e.g., small cells 602-607. In the illustrated example, serving base station 600 identifies the total number of virtual cell IDs in combination with scrambling IDs across macro region 60 and neighboring cells is 12. Thus, the set of virtual cell IDs is represented by:

$$V = \{v_0, v_1, v_2, v_3, v_4, v_5, v_6, v_7, v_8, v_9, v_{10}, v_{11}\} \quad (3)$$

where the first six IDs ($v_0$ through $v_5$) correspond to transmission points located with macro region 60, small cells 601-607, and the remaining six IDs ($v_6$ through $v_{11}$) to transmission points located in neighboring macro region 61, small cells 609-614. Macro region 61 is provided by neighboring macro base station 608. In this case, serving base station 600 would transmit the following subsets of virtual cell IDs to UE 601:

$$U_A = \{v_0, v_1, v_2, \ldots, v_5\} \quad (4)$$

$$U_B = \{v_6, v_7, v_8, \ldots, v_{11}\} \quad (5)$$

Figure 7:
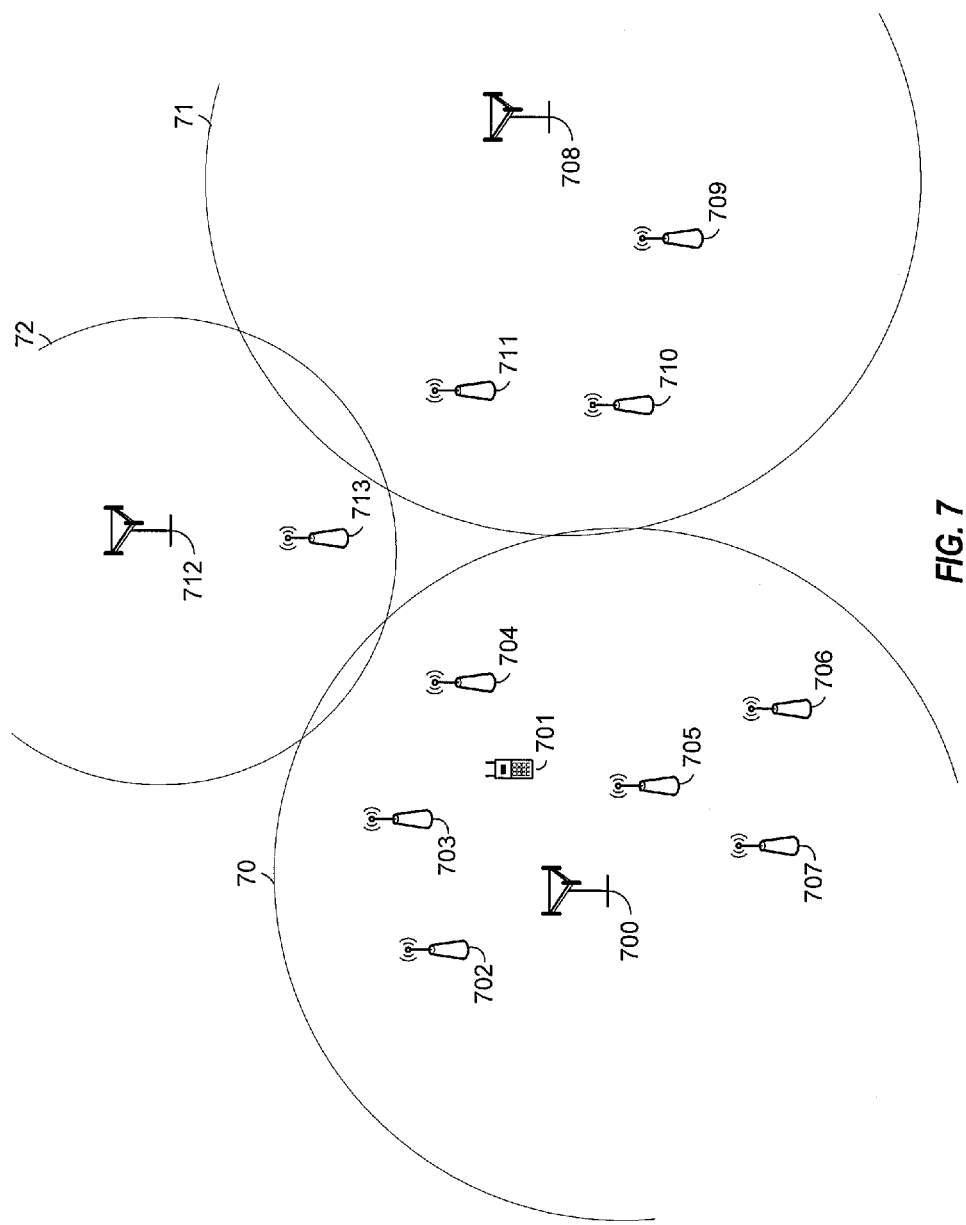
FIG. 7 is a block diagram illustrating a serving base station configured according to one aspect of the present disclosure.

FIG. 7 is a block diagram illustrating a serving base station 700 configured according to one aspect of the present disclosure. Serving base station 700 provides communication coverage in macro region 70. UE 701 is located within macro region 70 and is engaged in communication services with serving base station 700. UE 701 may also be engaged in CoMP communications with serving base station 700 and any number of transmission points located within macro region 70, e.g., small cells 702-707. In the illustrated example, serving base station 700 identifies the total number of virtual cell IDs in combination with scrambling IDs across macro region 70 and any neighboring cells is 10. Thus, the set of virtual cell IDs is represented by:

$$v = \{v_0, v_1, v_2, v_3, v_4, v_5, v_6, v_7, v_8, v_9\} \quad (6)$$

where $v_0$ through $v_5$ correspond to transmission points (small cells 702-707) located with macro region 70, $v_6$ through $v_8$ correspond to transmission points (small cells 709-711) located in neighboring macro region 71 serviced by macro base station 708, and $v_9$ corresponds to a transmission point (small cell 713) located in macro region 72 serviced by macro base station 712. In this case, serving base station 700 would group the set of virtual IDs, V, into subgroups according to the primary cell IDs of serving base station 700 and macro base stations 708 and 712, and transmit the subsets ($U_A$, $U_B$, and $U_C$) to UE 701 as follows:

$$U_A = \{v_0, v_1, v_2, \ldots, v_5\} \quad (7)$$

$$U_B = \{v_6, v_7, v_8\} \quad (8)$$

$$U_C = \{v_9\} \quad (9)$$

Figure 8:
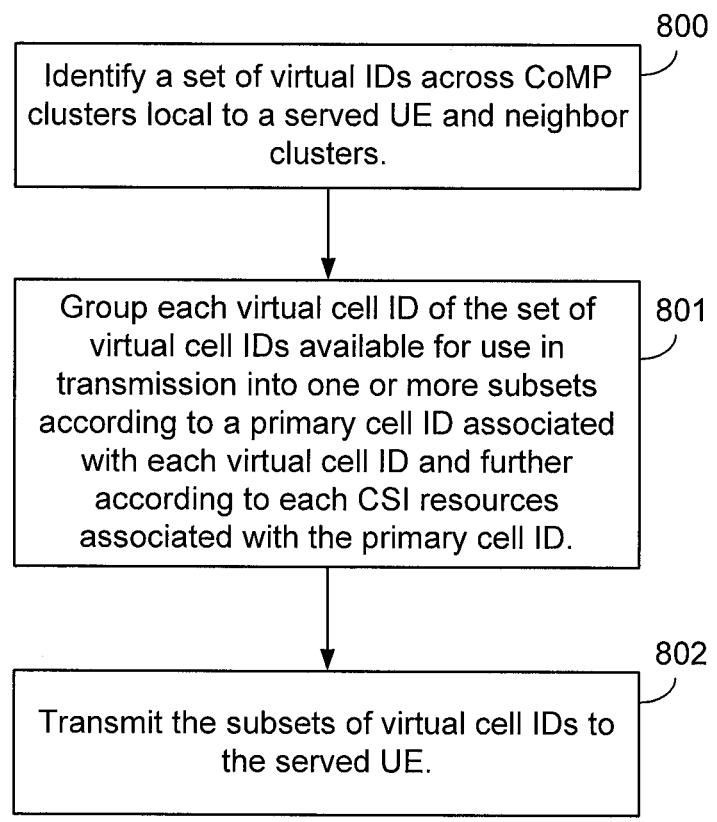
FIG. 8 is a functional block diagram illustrating example blocks executed to implement one aspect of the present disclosure.

Additional aspects of the present disclosure are related to grouping the total set of virtual cell IDs into subsets according to an association with various channel state information (CSI) resources. FIG. 8 is a functional block diagram illustrating example blocks executed to implement one aspect of the present disclosure. At block 800, a serving base station identifies a set of virtual cell IDs for transmission points across CoMP clusters both local to a served UE and in neighboring CoMP clusters.

At block 801, the serving base station groups each of the virtual cell IDs available for use in transmission into one or more subsets according to the primary cell ID associated with each virtual cell ID and further according to each CSI resource associated or available with the primary cell ID. Each CoMP cluster, which is associated with a primary cell ID of the macro cell to which the CoMP cluster belongs, has a certain number of CSI resources. These available CSI resources may be identified by CSI resource index. The number of virtual cell IDs per CSI resource is also limited to a maximum number, that may be semi-statically selected by the serving base station. Thus, the serving base station form subsets of cell IDs based on both the CoMP cluster (e.g., the macro region identified by the primary cell ID) and the particular CSI resources available within that CoMP cluster.

At block 802, the serving cell transmits the subsets of virtual cell IDs to the UE being served. The subsets of virtual cell IDs that are grouped according to primary cell ID and CSI resource may be used by the UE to perform blind detection for purposes of detection, cancellation, or mitigation of interfering signals.

In operation of the aspect illustrated in FIG. 8, the serving base station identifies a restricted set of virtual cell IDs corresponding to the transmission points located in the CoMP cluster in which the UE is located as well as the neighboring cell's CoMP clusters. Here again, the virtual cell ID set encompasses different combinations of virtual cell IDs with DMRS scrambling ID. In CoMP operation, the number of CSI resources per CoMP cluster may be represented by C, while the number of virtual cell IDs per CSI resource is limited to a maximum of V virtual cell IDs, and the total number of virtual cell IDs across all cells may be limited to a maximum of N, where each of C, V, and N may be semi-statically selected by the serving base station. In operation, C and V may each be less than or equal to N. Because the subsets of virtual cell IDs are grouped according to CSI resource within each CoMP cluster, the virtual cell IDs of such subsets would be applicable to PDSCH, CSI-RS and ePDCCH transmissions in the CoMP clusters.

Each CoMP cluster belongs to a macro cell region, which may be uniquely identifiable by a primary cell ID. Within each CoMP cluster, there can be multiple CSI resources and each resource may utilize multiple virtual cell IDs that may potentially overlap between such sets of virtual cell IDs. Accordingly, the serving cell may associate the subset of virtual cell IDs within each CSI resource to the CSI resource index, and associate the CSI resources within each macro region to the primary cell ID of the macro cell.

Figure 9:
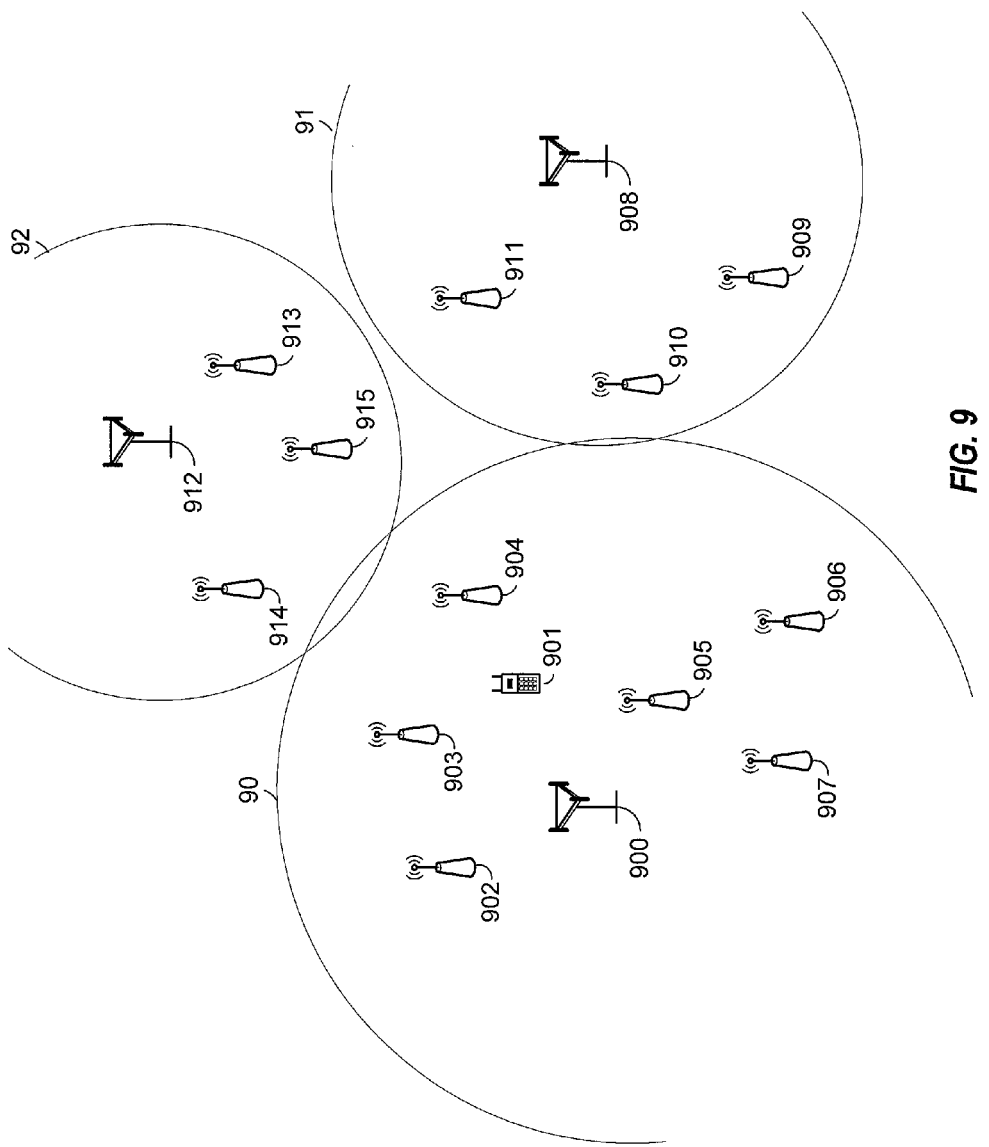
FIG. 9 is a block diagram illustrating a serving base station configured according to one aspect of the present disclosure.

FIG. 9 is a block diagram illustrating a serving base station 900 configured according to one aspect of the present disclosure. Serving base station 900 provides communication coverage in macro region 90. UE 901 is located within macro region 90 and is engaged in communication services with serving base station 900. UE 901 may also be engaged in CoMP communications with serving base station 900 and any number of transmission points located within macro region 90, e.g., small cells 902-907. Neighboring macro regions 91 and 92 are served by macro base stations 908 and 912, respectively, and include multiple transmission points as illustrated by small cells 909-911 in neighboring macro region 91, and small cells 913-915 in neighboring macro region 92. In the illustrated example, serving base station 900 identifies the total number of virtual cell IDs in combination with scrambling IDs across macro region 90 and any neighboring cells to be 12. This set of total virtual cell IDs is represented by:

$$V=\{v_0,v_1,v_2,v_3,v_4,v_5,v_6,v_7,v_8,v_9,v_{10},v_{11}\}, \quad (10)$$

where the CSI resources in macro region 90 correspond to $A_1$, $A_2$ and $A_3$, the CSI resources in neighboring macro region 91 correspond to $B_1$, $B_2$ and $B_3$, and the CSI resources in neighboring macro region 92 correspond to $C_1$, $C_2$ and $C_3$. In this case, serving base station 900 would group the set of virtual cell IDs, V, into multiple subsets according to CSI resource. Thus, serving base station 900 would transmit the following subsets ($U_{A1}$, $U_{A2}$, $U_{A3}$, $U_{B1}$, $U_{B2}$, $U_{B3}$, $U_{C1}$, $U_{C2}$, and $U_{C3}$) to UE 901: $U_A$: CSI resources are $\{A_1, A_2$ and $A_3\}$ and the virtual cell IDs are signaled as $$U_{A1}: \{v_0,v_1\} \quad (11)$$

$$U_{A2}: \{v_2,v_3\} \quad (12)$$

$$U_{A3}: \{v_4,v_5\} \quad (13)$$

$U_B$: CSI resources are $\{B_1, B_2$ and $B_3\}$ and the virtual cell IDs are signaled as $$U_{B1}: \{v_6,v_7\} \quad (14)$$

$$U_{B2}: \{v_7,v_8\} \quad (15)$$

$$U_{B3}: \{v_8,v_6\} \quad (16)$$

$U_C$: CSI resources are $\{C_1, C_2$ and $C_3\}$ and the virtual cell IDs are signaled as $$U_{C1}: \{v_9,v_{10}\} \quad (17)$$

$$U_{C2}: \{v_{10}\} \quad (18)$$

$$U_{C3}: \{v_{11}\} \quad (19)$$

As such, each of the subsets of virtual cell IDs grouped according to CSI resource may provide a smaller set of potential virtual cell IDs for UE 901 to use in detection, cancellation, or mitigation of interfering signals originating from neighboring macro regions 91 and 92.

Figure 10:
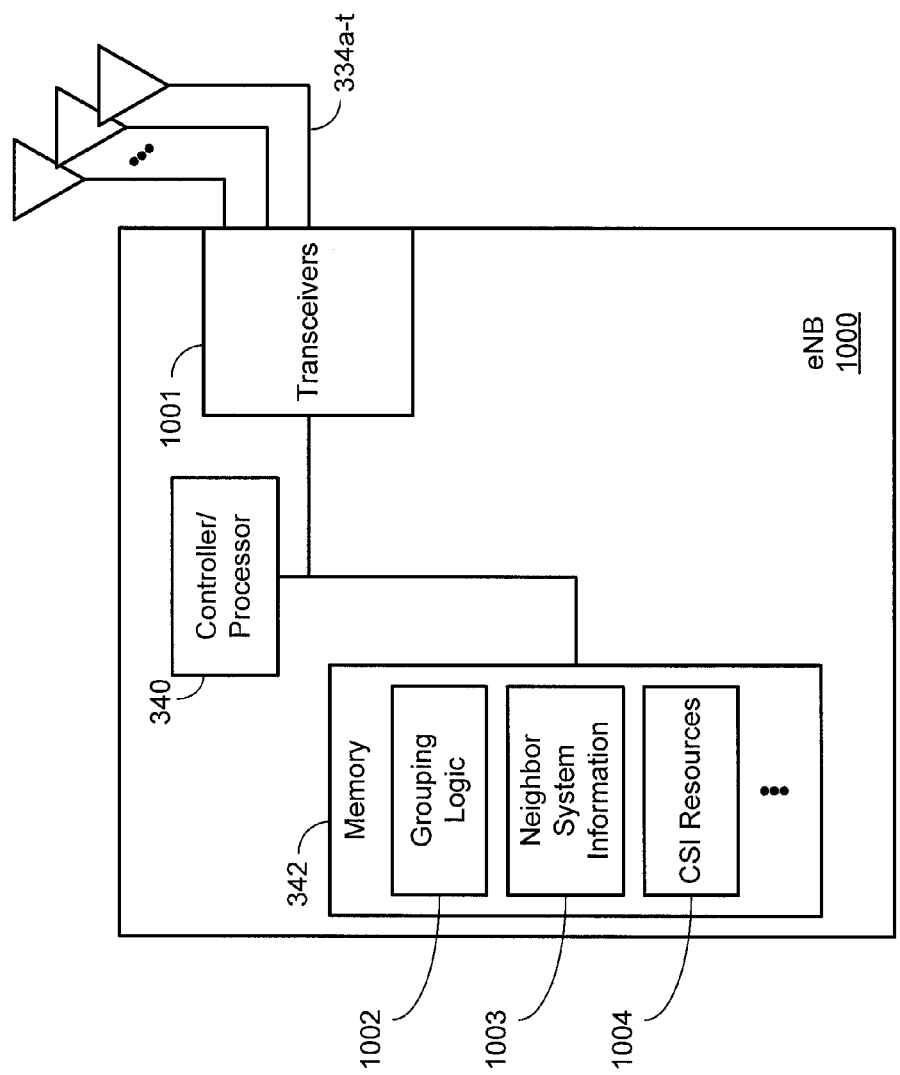
FIG. 10 is a block diagram illustrating an eNB configured according to one aspect of the present disclosure.

FIG. 10 is a block diagram illustrating an eNB 1000 configured according to one aspect of the present disclosure. eNB 1000 may include various components, hardware, and software as illustrated with regard to base station 110 of FIG. 3. For example, eNB 1000 includes a controller/processor 340 which controls the components and hardware and executes the software and logic stored on memory 342 which, when executed, creates the execution environment that provides the features and functionality of eNB 1000.

In one example aspect, eNB 1000 includes grouping logic 1002 stored in memory 342. In the described aspect, when executed by controller/processor 340, grouping logic 1002 provides for eNB 100 to identify a set of virtual cell IDs corresponding to one or more transmission points within a CoMP cluster associated the cell of eNB 1000 serving a UE and one or more neighboring transmission points in one or more neighboring CoMP clusters. eNB 1000 receives various system information for neighboring cells via antennas 342a-t and transceivers 1001 and stores this system information in memory 342 at neighbor system information 1003. Transceivers 1001 may include various hardware and components, such as transmit processor 320, transmit MIMO processor 330, receive processor 338, receive MIMO detector 336, and modulator/demodulators 332a-t, as illustrated in FIG. 3 with regard to base station 110.

Under control of controller/processor 340, in execution of grouping logic 1002, eNB 1000 groups each of the virtual cell IDs within the set that are available for use in transmission into one or more subsets of virtual cell IDs. eNB 1000 stores the primary cell IDs of any neighboring cells in neighbor system information 1003 in order to identify and group the different virtual cell IDs. After generating the subsets of virtual cell IDs, eNB 1000 will transmit one or more of the subsets to UEs served by eNB 1000. eNB 1000 transmits the subsets using transceivers 1001 and antennas 334a-t.

In additional example aspects, the execution of grouping logic 1002 by controller/processor 340 may provide for grouping of the virtual cell IDs of the set that are available for use in transmission according to the primary cell ID and CSI resources associated with the primary cell ID. eNB 1000 will keep track of the CSI resources associated with its own primary cell ID at CSI Resources 1004 stored in memory 342. eNB 1000 may also receive CSI resource information regarding neighboring cells in system information received about the neighboring cells. This neighbor cell CSI resource information may also be stored in addition to the other neighbor cell system information at neighbor system information 1003 in memory 342. Once grouped into the subsets of virtual cell IDs based on both primary cell ID and CSI resources, eNB 1000 will transmit one or more of such subsets to UEs that it is serving.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C) and any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
semi-statically selecting, by a serving base station, a maximum total number of virtual cell identities (IDs) associated with a combined area of a coordinated communication cluster and one or more neighboring coordinated communication clusters;

semi-statically selecting, by the serving base station, a maximum cluster number of virtual cell IDs associated with a maximum number of virtual cell IDs per coordinated cluster;

identifying, by the serving base station, a set of virtual cell IDs up to the maximum total number of virtual cell IDs and up to the maximum cluster number of virtual cell IDs, wherein the set of virtual cell IDs corresponds to at least one of: one or more transmission points located within a coordinated communication cluster in which a user equipment (UE) served by the serving base station is located, and one or more neighboring transmission points located within one or more neighboring coordinated communication clusters;

grouping, by the serving base station, each virtual cell ID of the set of virtual cell IDs available for use in transmission into one or more subsets of virtual cell IDs according to a primary cell ID associated with said each virtual cell ID; and transmitting, by the serving base station, the one or more subsets of virtual cell IDs to the UE.

2. The method of claim 1, wherein the each virtual cell ID corresponds to one or more combinations of the each virtual cell ID with a demodulation reference signal (DMRS) scrambling ID.

3. The method of claim 1, wherein each virtual cell ID of the set of virtual cell IDs corresponds to downlink shared channel communications and enhanced downlink control channel communications conducted in the coordinated communication cluster.

4. The method of claim 1, wherein each of the coordinated communication cluster and the one or more neighboring coordinated communication clusters is associated with a corresponding macro cell region.

5. The method of claim 4, wherein the coordinated communication cluster is associated with a serving macro cell region of the serving base station.

6. The method of claim 1, wherein the primary cell ID corresponds to a common reference signal (CRS) broadcast by the serving base station.

7. A method of wireless communication, comprising:
    semi-statically selecting, by a serving base station, a number of channel state information (CSI) resources in each of a coordinated communication cluster and one or more neighboring coordinated communication clusters;
    semi-statically selecting, by the serving base station, a maximum number of virtual cell identities (IDs) per CSI resource;
    semi-statically selecting, by the serving base station, a maximum total number of virtual cell IDs associated with a combined area of the coordinated communication cluster and the one or more neighboring coordinated communication clusters;
    identifying, by the serving base station, a set of virtual cell IDs across the maximum total number of virtual cell IDs, wherein the set of virtual cell IDs corresponds to at least one of: one or more transmission points located within a coordinated communication cluster in which a user equipment (UE) served by the serving base station is located, and one or more neighboring transmission points located within one or more neighboring coordinated communication clusters;
    grouping, by the serving base station, each virtual cell ID of the set of virtual cell IDs available for use in transmission into one or more subsets of virtual cell IDs according to a primary cell ID associated with said each virtual cell ID, according to each of one or more CSI resources associated with the primary cell ID, and according to the number of CSI resources per coordinated communication cluster and one or more neighboring coordinated communication clusters; and
    transmitting, by the serving base station, the one or more subsets of virtual cell IDs to the UE.

8. The method of claim 7, wherein the each virtual cell ID corresponds to one or more combinations of the each virtual cell ID with a demodulation reference signal (DMRS) scrambling ID.

9. The method of claim 7, wherein each of the one or more CSI resources is identified according to a corresponding CSI resource index.

10. The method of claim 7, wherein each virtual cell ID of the set of virtual cell IDs corresponds to downlink shared channel communications and enhanced downlink control channel communications and CSI reference signals (CSI-RS) transmitted in the coordinated communication cluster.

11. The method of claim 7, wherein each of the coordinated communication cluster and the one or more neighboring coordinated communication clusters is associated with a corresponding macro cell region.

12. The method of claim 11, wherein the coordinated communication cluster is associated with a serving macro cell region of the serving base station.

13. The method of claim 7, wherein the primary cell ID corresponds to a common reference signal (CRS) broadcast by the serving base station.

14. An apparatus configured for wireless communication, the apparatus comprising:
    at least one processor; and
    a memory coupled to the at least one processor,
    wherein the at least one processor is configured:
        to semi-statically select, by a serving base station, a maximum total number of virtual cell identities (IDs) associated with a combined area of a coordinated communication cluster and one or more neighboring coordinated communication clusters;
        semi-statically select, by the serving base station, a maximum cluster number of virtual cell IDs associated with a maximum number of virtual cell IDs per coordinated cluster;
        to identifying, by the serving base station, a set of virtual cell IDs up to the maximum total number of virtual cell IDs and up to the maximum cluster number of virtual cell IDs, wherein the set of virtual cell IDs corresponds to at least one of: one or more transmission points located within a coordinated communication cluster in which a user equipment (UE) served by the serving base station is located, and one or more neighboring transmission points located within one or more neighboring coordinated communication clusters;
        to group, by the serving base station, each virtual cell ID of the set of virtual cell IDs into one or more subsets of virtual cell IDs according to a primary cell ID associated with said each virtual cell ID; and
        to transmit, by the serving base station, the one or more subsets of virtual cell IDs to the UE.

15. The apparatus of claim 14, wherein the each virtual cell ID corresponds to one or more combinations of the each virtual cell ID with a demodulation reference signal (DMRS) scrambling ID.

16. The apparatus of claim 14, wherein each virtual cell ID of the set of virtual cell IDs corresponds to downlink shared channel communications and enhanced downlink control channel communications conducted in the coordinated communication cluster.

17. The apparatus of claim 14, wherein each of the coordinated communication cluster and the one or more neighboring coordinated communication clusters is associated with a corresponding macro cell region.

18. The apparatus of claim 17, wherein the coordinated communication cluster is associated with a serving macro cell region of the serving base station.

19. The apparatus of claim 14, wherein the primary cell ID corresponds to a common reference signal (CRS) broadcast by the serving base station.

20. An apparatus configured for wireless communication, the apparatus comprising:
   at least one processor; and
   a memory coupled to the at least one processor,
   wherein the at least one processor is configured:
      to semi-statically select, by a serving base station, a number of channel state information (CSI) resources in each of a coordinated communication cluster and one or more neighboring coordinated communication clusters;
      to semi-statically selecting, by the serving base station, a maximum number of virtual cell identities (IDs) per CSI resource;
      to semi-statically select, by the serving base station, a maximum total number of virtual cell IDs associated with a combined area of the coordinated communication cluster and the one or more neighboring coordinated communication clusters;
      to identify, by the serving base station, a set of virtual cell IDs across the maximum total number of virtual cell IDs, wherein the set of virtual cell IDs corresponds to at least one of: one or more transmission points located within a coordinated communication cluster in which a user equipment (UE) served by the serving base station is located, and one or more neighboring transmission points located within one or more neighboring coordinated communication clusters;
      to group, by the serving base station, each virtual cell ID of the set of virtual cell IDs into one or more subsets of virtual cell IDs according to a primary cell ID associated with said each virtual cell ID, according to each of one or more CSI resources associated with the primary cell ID, and according to the number of CSI resources per coordinated communication cluster and one or more neighboring coordinated communication clusters; and
      to transmit, by the serving base station, the one or more subsets of virtual cell IDs to the UE.

21. The apparatus of claim 20, wherein the each virtual cell ID corresponds to one or more combinations of the each virtual cell ID with a demodulation reference signal (DMRS) scrambling ID.

22. The apparatus of claim 20, wherein each of the one or more CSI resources is identified according to a corresponding CSI resource index.

23. The apparatus of claim 20, wherein each virtual cell ID of the set of virtual cell IDs corresponds to downlink shared channel communications and enhanced downlink control channel communications and CSI reference signals (CSI-RS) transmitted in the coordinated communication cluster.

24. The apparatus of claim 20, wherein each of the coordinated communication cluster and the one or more neighboring coordinated communication clusters is associated with a corresponding macro cell region.

25. The apparatus of claim 24, wherein the coordinated communication cluster is associated with a serving macro cell region of the serving base station.

26. The apparatus of claim 20, wherein the primary cell ID corresponds to a common reference signal (CRS) broadcast by the serving base station.

* * * * *